United States Patent Office 2,849,277
Patented Aug. 26, 1958

2,849,277
PROCESS OF SECURING PLUTONIUM IN NITRIC ACID SOLUTIONS IN ITS TRIVALENT OXIDATION STATE

John R. Thomas, Silver Spring, Md., assignor to the United States of America as represented by the United States Atomic Energy Commission No Drawing. Application July 26, 1949
Serial No. 106,967

11 Claims. (Cl. 23—14.5)

This invention deals with the reduction of metal ions to their lower oxidation state and in particular with the reduction of hexavalent and tetravalent plutonium ions to trivalent plutonium ions.

In many chemical processes, it is necessary to convert metal salts to those of the lower or lowest oxidation state and/or to maintain them therein. One of the many instances where this is important is in the solvent extraction of plutonium salts. Trivalent plutonium salts are substantially non-extractable from aqueous solutions by the organic solvents which have been found useful by others for extraction of tetravalent and hexavalent plutonium salts from their aqueous solutions, preferably containing salting-out agents. Hexavalent uranium salts are soluble in water and extractable from their aqueous solutions by organic solvents. These properties are being utilized, according to inventions made by others, for extracting plutonium and for separating it from uranium.

For further processing of aqueous solutions containing plutonium salts it is often desirable to have these salts in an aqueous nitric acid solution. An aqueous nitric acid solution of plutonium salts is also obtained in various processes of dissolving mixtures containing uranium and plutonium whereby uranium is dissolved and obtained as a uranyl salt whereas plutonium is dissolved in the form of its tetravalent salt. Another instance where an aqueous nitric acid solution of plutonium results, is after conjointly extracting uranium and plutonium salts from aqueous nitric acid solutions by organic solvents and then re-extracting plutonium in its trivalent state by contacting the solvent solution with an aqueous solution containing a salting-out agent and a reducing agent for the plutonium.

In such instances, where metal ions are desired in their lower valence state, ferrous salts are often used as the reducing agent. Ferrous ion has an especial advantage in the specific case of the separation of plutonium from uranium, because, while $Fe^{++}$ reduces plutonium rapidly, it does not have any reducing effect on uranium and thus leaves uranium in the hexavalent state which is non-extractable by water containing a salting-out agent.

However, there is one disadvantage connected with the use of ferrous ion in conjunction with aqueous nitric acid solutions of metals. Ferrous ion is oxidized in a nitric acid solution so that it loses its reducing effect; consequently reduction of the metal and maintenance of it in the reduced state are not possible.

It is an object of this invention to provide a process for stabilizing ferrous ions in nitric acid solutions.

It is also an object of this invention to provide a process for treating nitric acid solutions of metal salts so as to reduce them to and maintain them in a lower oxidation state.

It is another object of this invention to provide aqueous nitric acid solutions of trivalent plutonium salts that are characterized by a high degree of stability.

It is still another object of this invention to provide a process for securing dissolved plutonium in its trivalent state.

It is still another object of this invention to extract plutonium from an organic solution thereof while reducing it to its trivalent state and maintaining it therein.

It has been found that by adding to the solution of trivalent plutonium salts a stabilizer or holding reductant, oxidation of the plutonium is prevented. Sulfamate ions have been found to be ideally suitable as stabilizers even in the presence of nitric acid. The invention thus comprises the preparation of an aqueous solution containing a plutonium salt, nitric acid, a ferrous ion, and a sulfamate ion.

In order to qualify as a stabilizer or holding reductant, a substance has to be non-reactive with the solvent to be used for the extraction of other ingredients admixed with the plutonium; it must also be non-reactive with the nitric acid, and must not be complex-forming with trivalent, tetravalent or hexavalent plutonium or any other salts contained in the mixture to be treated, such as hexavalent uranium or the salts of fission products. A stabilizer, if suitable for the purpose of this invention, must also not adversely affect the distribution coefficient of the salts to be separated between the aqueous phase and the solvent phase, and it must, finally, also not impair the rate of reduction of the plutonium. Sulfamic acid or sulfamates have been found to have all of the qualifications required.

The ferrous ion necessary for reducing the plutonium may be added in the form of the chloride, the nitrate, the sulfate, or any other water-soluble salt; likewise, the sulfamate ion may be added in the form of sodium sulfamate, ammonium sulfamate, or any other water-soluble salt. It is preferable, though, in most cases to add both ions in the form of one substance, namely, as ferrous sulfamate. The use of ferrous sulfamate has the advantage that no other ions than those necessary are added, which is particularly desirable when the aqueous solution is concentrated for subsequent processing.

The concentration of the sulfamic acid or sulfamate solution is not critical. To a certain degree it depends on the time which elapses between the preparation of the plutonium solution and its use, in other words, on the period of time for which the plutonium and the iron have to be "held" in their reduced state. Concentrations ranging from 0.001 to 0.5 M have been found suitable; if about a day elapses between the preparation and the use of the plutonium solution, a concentration of approximately 0.05 M for the sulfamic acid has been found satisfactory.

There are several types of organic compounds that are satisfactory solvents for the extraction of a plutonium salt from an aqueous solution containing a salting-out agent in which the plutonium salt is in a valence state of at least +4. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. The following is a list of compounds that are suitable extractants for the separation of a plutonium salt from aqueous solutions containing salting-out agents.

Ethyl ether
Isopropyl ether
Butoxyethoxyethane (ethyl butyl "Cellosolve")
Diethyl ether of ethylene glycol (diethyl "Cellosolve")
Dibutyl ether of diethylene glycol (dibutyl "Carbitol")
Dibutyl ether of tetraethylene glycol
Ethyl acetate
n-Propyl acetate Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide As salting-out agents, water-soluble inorganic salts are suitable; however, one of the following metal nitrates is preferred: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, and $Al(NO_3)_3$.

The following examples are given for the purpose of illustrating the favorable effect of sulfamate ions without the intention to limit the invention to the details given therein.

EXAMPLE I

A solution containing 8 M ammonium nitrate, 0.75 M nitric acid, and 0.04 M ferrous ion was found to be stable with regard to oxidation of ferrous ion for less than one hour. The same solution, when 0.01 M sulfamic acid was added, remained stable for over four hours. The same sulfamic acid-containing solution, when continuously mixed by stirring with an equal volume of hexone pretreated and equilibrated with other portions of an aqueous solution of the above concentration, remained stable for over twenty-three hours.

EXAMPLE II

An aqueous phase of 24-ml. volume containing 8 M ammonium nitrate, 0.25 M nitric acid, 0.11 M sulfamic acid, 0.042 M ferrous ammonium sulfate, and a hexone phase of 20-ml. volume, pretreated and pre-equilibrated with other portions of an aqueous solution of the above concentration, were thoroughly stirred. After eleven hours, the ferrous ion in the solution was found still to be unaffected.

EXAMPLE III

Typical of batch experiments demonstrating the ability of sulfamic acid to keep plutonium in the trivalent state is one example in which the aqueous phase of the stirred two-phase system contained 8 M ammonium nitrate, 0.15 M nitric acid, 0.19 M uranyl nitrate, 0.025 M ferrous ammonium sulfate, 0.002 M sulfamic acid, and plutonium tracer (added as a solution of a tetravalent plutonium salt). After five days of stirring, the plutonium had a distribution coefficient (aqueous/hexone) of 550, which constitutes an adequate demonstration of the ability of sulfamic acid to "hold" Pu(III) for the period noted.

EXAMPLE IV

This example shows the effectiveness of sulfamic acid in the presence of considerable concentrations of uranyl nitrate.

As in the examples given above, a two-phase system was established and vigorously stirred in which the aqueous phase contained 8 M ammonium nitrate, 0.5 M nitric acid, 0.75 M uranyl nitrate, 0.024 M ferrous ammonium sulfate and 0.0024 M sulfamic acid. After twenty-one hours of stirring, 77% of the ferrous salt was still in the reduced state. The same experiment, when repeated without the addition of sulfamic acid, showed complete oxidation of the ferrous to ferric ions within a few minutes.

EXAMPLE V

This example is to illustrate the lack of any complex formation between the salts of the aqueous phase, particularly uranyl salt, and the sulfamic acid.

An aqueous phase containing 8 M ammonium nitrate, 0.59 M nitric acid, 0.1 M sulfamic acid and 0.08 M uranyl nitrate when thoroughly mixed with an equilibrated hexone phase gave a distribution coefficient of the uranyl ion (hexone/aqueous) of 2.2 which is identical to that observed with an aqueous solution of the same composition but lacking the sulfamic acid.

EXAMPLE VI

A two-phase system, of hexone and an aqueous phase which contained 1 M $Al(NO_3)_3$, 0.35 M $HNO_3$, 0.1 M sulfamic acid, and tracer concentration of a Pu(VI) salt, was thoroughly stirred. The distribution coefficient (hexone/aqueous) of plutonium was found to be 7.0 which, as in Example V, is identical to the value observed in the absence of sulfamic acid. Thereafter $Fe^{++}$ was added in a quantity so as to yield a concentration of 0.025 M. One-half minute after the addition of $Fe^{++}$, the distribution coefficient had been reduced to 0.0021 and after two and one-half minutes to 0.0006.

In an identical system, except having a salt of Pu(IV) instead of Pu(VI), the distribution coefficient and the rate of reduction were found to be the same as in the instance of Pu(VI). This shows that no complex formation takes place between either Pu(IV) or Pu(VI) with the sulfamic acid.

EXAMPLE VII

In the following table data and the results of a number of tests are compiled which illustrate the satisfactory operation and show that a very high degree of separation of uranium and plutonium occurs by back extraction when either ferrous sulfamate or sulfamic acid is used. In other words, very small quantities of plutonium remain in the solvent phase and very small quantities of uranium are extracted by the aqueous phase. In these experiments, the hexone solution of plutonium and uranyl salts contained about 0.5 M $HNO_3$, part of which was extracted by the aqueous phase.

*Table*

| Sulfamic acid, M | Ferrous $NH_4$ sulfate, M | Ferrous sulfamate, M* | $Al(NO_3)_3$, M | Percent Pu Remaining in solvent phase (with regard to original content of feed) | Percent U extracted by aqueous phase (with regard to original content of feed) |
|---|---|---|---|---|---|
| 0.1 | 0.05 |  | 0.9 | 0.005 | 0.90 |
| 0.1 | 0.05 |  | 0.9 | 0.008 | 0.06 |
| 0.1 | 0.05 |  | 1.0 | 0.00064 | 0.04 |
| 0.1 | 0.05 |  | 2.0 | 0.00005 | 0.04 |
|  |  | 0.05 | 1.0 | 0.00005 | 0.10 |
|  |  | 0.05 | 1.4 |  | 0.20 |
|  |  | 0.05 | 1.3 | 0.00006 | 0.40 |
|  |  | 0.05 | 1.3 | 0.00001 | 0.10 |
|  |  | 0.05 | 1.3 | 0.00016 | 0.14 |
|  |  | 0.05 | 1.3 | 0.00004 | 0.43 |

*Ferrous sulfamate contained free sulfamic acid.

While the invention has been primarily described in connection with plutonium, it will be understood that it is applicable to other metals which are to be retained in a reduced state.

The invention may be used in a batch process, or in a continuous process, co-current as well as countercurrent.

It will be understood that while there have been described herein certain specific embodiments of the invention, it is not intended thereby to have the invention limited to the details given, since the invention is susceptible to various modifications and changes which come within the spirit of the disclosure and the scope of the appended claims.

What is claimed is:

1. A process for securing plutonium in the trivalent state in aqueous solutions, comprising preparing an aqueous solution containing a plutonium salt, nitric acid, ferrous ion, and sulfamate ion.

2. A process for securing plutonium in the trivalent state in aqueous solutions, comprising preparing an aqueous solution containing a plutonium salt, nitric acid, a water-soluble ferrous salt, and a water-soluble sulfamate.

3. A process for securing plutonium in the trivalent state in aqueous solutions, comprising preparing an aqueous solution containing a plutonium salt, nitric acid, and ferrous sulfamate.

4. A process for securing plutonium in the trivalent state in aqueous solutions, comprising preparing an aqueous solution containing a plutonium salt, nitric acid, ferrous ion, and sulfamate ion, said sulfamate ion being present in a concentration ranging from 0.001 to 0.5 M.

5. A process for securing plutonium in the trivalent state in aqueous solutions, comprising preparing an aqueous solution containing a plutonium salt, nitric acid, ferrous ion, and sulfamate ion, said sulfamate ion being present in a concentration of approximately 0.05 M.

6. A process for the separation of plutonium from an organic solvent solution of uranyl salt and a plutonium salt having a valence of at least +4, which comprises contacting said organic solvent solution with an aqueous nitric acid solution containing a salting-out agent, ferrous ions and sulfamate ions, and separating said aqueous phase containing trivalent plutonium salt from said organic solvent phase containing said uranyl salt.

7. The process of claim 6 wherein the organic solvent is hexone.

8. A process of separating plutonium from uranium comprising forming an aqueous solution of tetravalent plutonium nitrate and uranyl nitrate, reducing the plutonium to the trivalent state by adding ferrous salt and sulfamate ions, and extracting the uranium by contacting said aqueous solution with a substantially water-immiscible organic solvent.

9. The process of claim 8 wherein the organic solvent is hexone.

10. The process of claim 6 wherein the organic solvent is tributyl phosphate.

11. The process of claim 8 wherein the organic solvent is tributyl phosphate.

References Cited in the file of this patent

Divers et al.: Journal of the Chemical Society (London), vol. 69, pages 1634, 1644 (1896).

UNITED STATES PATENT OFFICE
CERTIFICATE OF CORRECTION

Patent No. 2,849,277

August 26, 1958

John R. Thomas

It is hereby certified that error appears in the printed specification of the above numbered patent requiring correction and that the said Letters Patent should read as corrected below.

Column 1, line 60, after the period, insert the following:

-- This oxidation is not believed to be directly affected by the nitric acid but rather by the $NO_2$ and nitrous acid which are present in all but the very purest nitric acid. Since the formation of these two substances is autocatalytic, it is almost impossible to prepare and maintain a nitric acid solution in which they are not present. --.

(SEAL)
Attest:

Signed and sealed this 2nd day of June 1959.

KARL H. AXLINE
Attesting Officer

ROBERT C. WATSON
Commissioner of Patents